(12) United States Patent
Nam

(10) Patent No.: US 8,032,698 B2
(45) Date of Patent: Oct. 4, 2011

(54) HYBRID HARD DISK DRIVE CONTROL METHOD AND RECORDING MEDIUM AND APPARATUS SUITABLE THEREFORE

(75) Inventor: Hye-jeong Nam, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1066 days.

(21) Appl. No.: 11/633,564

(22) Filed: Dec. 5, 2006

(65) Prior Publication Data
US 2007/0162693 A1 Jul. 12, 2007

(30) Foreign Application Priority Data
Jan. 12, 2006 (KR) .................. 10-2006-0003496

(51) Int. Cl.
*G06F 12/00* (2006.01)
(52) U.S. Cl. ............ 711/113; 711/103; 711/E12.008
(58) Field of Classification Search ............ 711/113
See application file for complete search history.

(56) References Cited

U.S. PATENT DOCUMENTS

| | | | | |
|---|---|---|---|---|
| 5,583,812 | A * | 12/1996 | Harari .................. | 365/185.33 |
| 5,860,083 | A * | 1/1999 | Sukegawa .................. | 711/103 |
| 6,249,838 | B1 | 6/2001 | Kon | |
| 7,394,689 | B2 * | 7/2008 | Ryu .................. | 365/185.09 |
| 7,467,253 | B2 * | 12/2008 | Yero .................. | 711/103 |
| 2003/0196029 | A1 * | 10/2003 | Komatsu et al. .............. | 711/103 |
| 2004/0156251 | A1 * | 8/2004 | Shiota et al. .................. | 365/200 |

FOREIGN PATENT DOCUMENTS

| | | |
|---|---|---|
| JP | 06-28899 | 2/1994 |
| JP | 2003-85041 | 3/2003 |
| JP | 2003-85054 | 3/2003 |

OTHER PUBLICATIONS

Korean Office Action dated Dec. 13, 2006 issued in KR 2006-3496.
Nathan Obr; (Non Volatile Cache Command Proposal for ATA8-ACS); Feb. 7, 2005; pp. 1-5.

* cited by examiner

*Primary Examiner* — Reginald Bragdon
*Assistant Examiner* — Aracelis Ruiz
(74) *Attorney, Agent, or Firm* — Stanzione & Kim, LLP

(57) ABSTRACT

A method of controlling a hybrid HDD to permanently deactivate a non-volatile cache support mode by determining whether a limit in the use of a non-volatile cache is passed, and a recording medium and apparatus suitable for the control method. The control method of a hybrid hard disk drive having a hard disk and a non-volatile cache includes determining whether an erasure number of the non-volatile cache exceeds a usage limit based on the erasure number of the non-volatile cache, and permanently deactivating a non-volatile cache support mode when the erasure number of the non-volatile cache is determined to exceed the usage limit.

20 Claims, 5 Drawing Sheets

HYBRID HARD DISK DRIVE CONTROL METHOD AND RECORDING MEDIUM AND APPARATUS SUITABLE THEREFORE

CROSS-REFERENCE TO RELATED APPLICATIONS

This application claims the benefit under 35 U.S.C. 119 §(a) from Korean Patent Application No. 10-2006-0003496, filed on Jan. 12, 2006, in the Korean Intellectual Property Office, the disclosure of which is incorporated herein in its entirety by reference.

BACKGROUND OF THE INVENTION

1. Field of the Invention

The present general inventive concept relates to a hybrid hard disk drive (HDD) having a hard disk and a non-volatile cache, and more particularly, to a method of controlling a hybrid HDD to permanently deactivate a non-volatile cache support mode by determining whether the limit in the use of a non-volatile cache is passed, and a recording medium and apparatus suitable for the control method.

2. Description of the Related Art

In a hybrid HDD, a non-volatile cache is additionally provided in addition to a typical HDD. The non-volatile cache is embodied by a flash memory. The hybrid HDD is advantageous in the following points as compared to a conventional HDD.

First, a booting time of an operating system (OS) may be reduced. Since files needed for the booting of the OS are copied to the non-volatile cache and used during booting, the booting time may be reduced. The typical HDD requires a time for a spindle motor to rotate up to a specified velocity during a power reset. However, since a host using the hybrid HDD may read the files needed for the booting of the OS from the non-volatile cache not located in the HDD, the booting time may be greatly reduced.

Second, a data access time may be reduced. Data to be used by the host using the hybrid HDD is simultaneously recorded on the non-volatile cache and a hard disk. When the data is read, the non-volatile cache is searched first. If appropriate data is found, the data is read from the non-volatile cache. Considering that recently recorded data is high-possibility accessed, the data access time may be reduced by using the non-volatile cache.

As it is widely known, the flash memory has a limit to how many times it may be used. Unlike a DRAM, writing to the flash memory involves first erasing a corresponding block, and the number of erasing operations is limited. The number of erasing operations of a currently used flash memory is limited to about 100,000.

FIG. 1 is a graph illustrating a relationship between an error of a flash memory and an erasure number limit. As illustrated in FIG. 1, when the erasure number of the flash memory exceeds the erasure limit number, an error, i.e., a data error during recording and reading, sharply increases. Thus, in the hybrid HDD, when the flash memory is used over the limited number of use, that is, when the non-volatile cache is used over an appropriate limit, the non-volatile memory may not be used further.

SUMMARY OF THE INVENTION

The present general inventive concept provides a method of controlling a hybrid HDD by permanently deactivating a non-volatile cache support mode when the number of erasing operations of a non-volatile cache exceeds an erasure limit number, thereby improving reliability.

The present general inventive concept provides a computer readable recording medium containing a program executing the above control method.

The present general inventive concept provides an apparatus suitable for the above control method.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a method of controlling a hybrid hard disk drive including a hard disk and a non-volatile cache, the method including determining whether the number of erasing operations of the non-volatile cache exceeds a usage limit, and permanently deactivating a non-volatile cache support mode when the number of erasing operations of the non-volatile cache is determined to exceed the usage limit.

The determining of the usage limit may include determining the erasure number of the non-volatile cache by counting the number of erasures performed by the non-volatile cache, and determining that the erasure number of the non-volatile cache exceeds the usage limit when the erasure number is greater than a predetermined erasure limit number.

The determining of the usage limit further may include detecting a defective block number of the non-volatile cache by detecting the number of defective blocks in the non-volatile cache, and determining that the erasure number of the non-volatile cache exceeds a usage limit when the defective block number is not less than a predetermined threshold value.

The foregoing and/or other aspects and utilities of the present general inventive concept may also be achieved by providing a computer readable recording medium containing a program executing a method of controlling a hybrid hard disk drive having a hard disk and a non-volatile cache, wherein the method includes, determining whether the number of erasing operations of the non-volatile cache exceeds a usage limit based on the number of erasing operations of the non-volatile cache, and permanently deactivating a non-volatile cache support mode when the number of erasing operations of the non-volatile cache is determined to exceed the usage limit.

The foregoing and/or other aspects and utilities of the present general inventive concept may also be achieved by providing a hybrid hard disk drive including a hard disk, a non-volatile cache, and a control portion to control recording of data from a host device on the hard disk and the non-volatile cache, wherein the control portion determines whether the number of erasing operations of the non-volatile cache exceeds a usage limit based on the number of erasing operations of the non-volatile cache and permanently deactivates a non-volatile cache support mode when the number of erasing operations of the non-volatile cache is determined to exceed the usage limit.

The control portion may notify the host device when recording in the non-volatile cache is no longer effective, so that the host device no longer uses the non-volatile cache.

The foregoing and/or other aspects and utilities of the present general inventive concept may also be achieved by providing a method of a hybrid HDD, the method including detecting a defective block number of a non-volatile cache by detecting the number of defective blocks in the non-volatile cache, and determining that the defective block number is not less than a predetermined threshold value.

The foregoing and/or other aspects and utilities of the present general inventive concept may also be achieved by providing a method of a hybrid HDD, the method including permanently deactivating a non-volatile cache mode according to one of an erasure number of a non-volatile cache, and the number of defective blocks of the non-volatile cache.

The foregoing and/or other aspects and utilities of the present general inventive concept may also be achieved by providing a hybrid HDD including an HDD, a non-volatile cache, and a control portion to control the HDD and the non-volatile cache in a non-volatile cache support mode according to an erasure number of the non-volatile cache.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
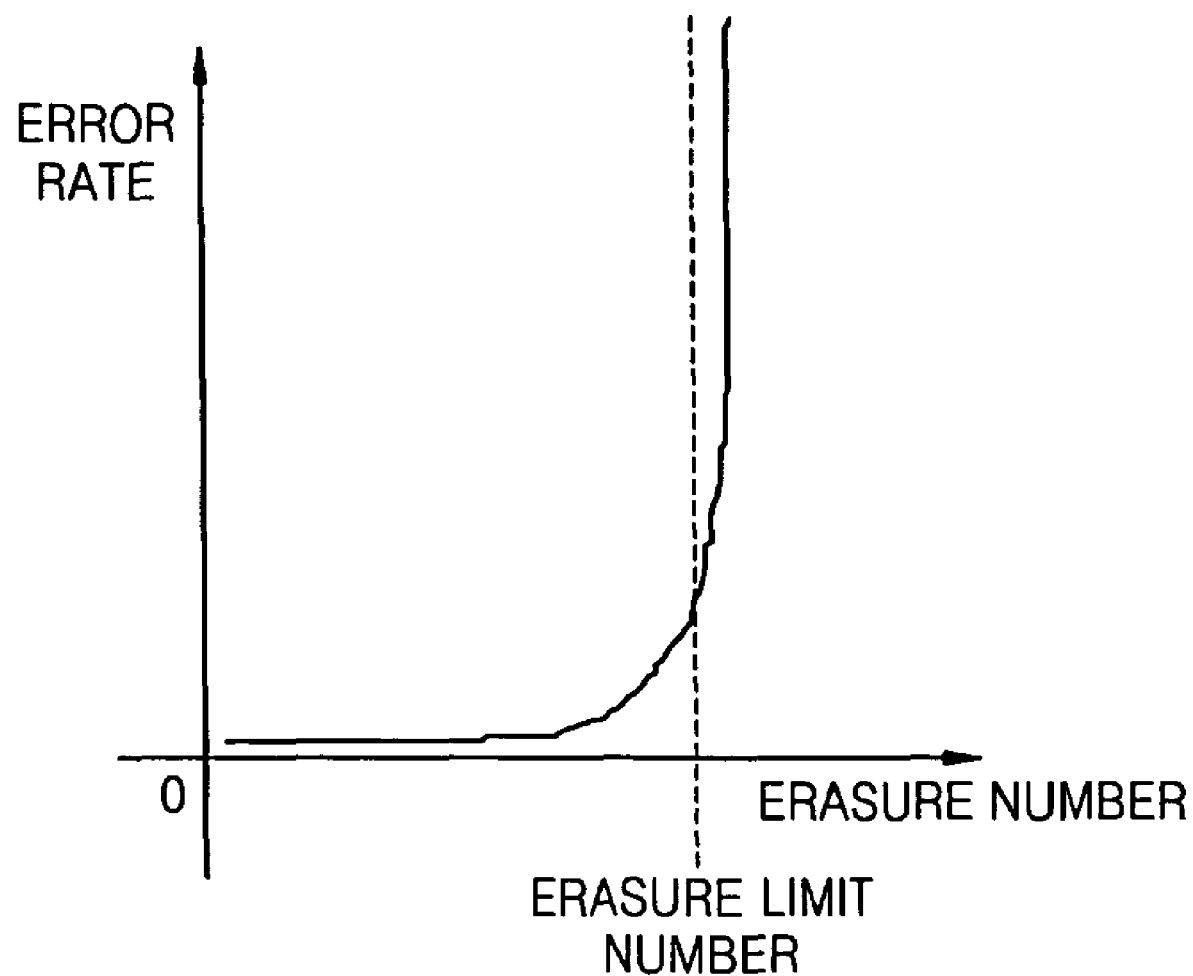
FIG. 1 is a graph illustrating a relationship between an error of a flash memory and an erasure number limit.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Two methods exist to determine whether a non-volatile cache is used in excess of a predetermined limit. A first method is to count the number of erasing operations (erasure number) for each block to determine whether the number of blocks having the erasure number over an erasure limit number exceeds a predetermined limit block number. A second method is to determine whether the number of defective blocks exceeds the predetermined limit block number.

Figure 2:
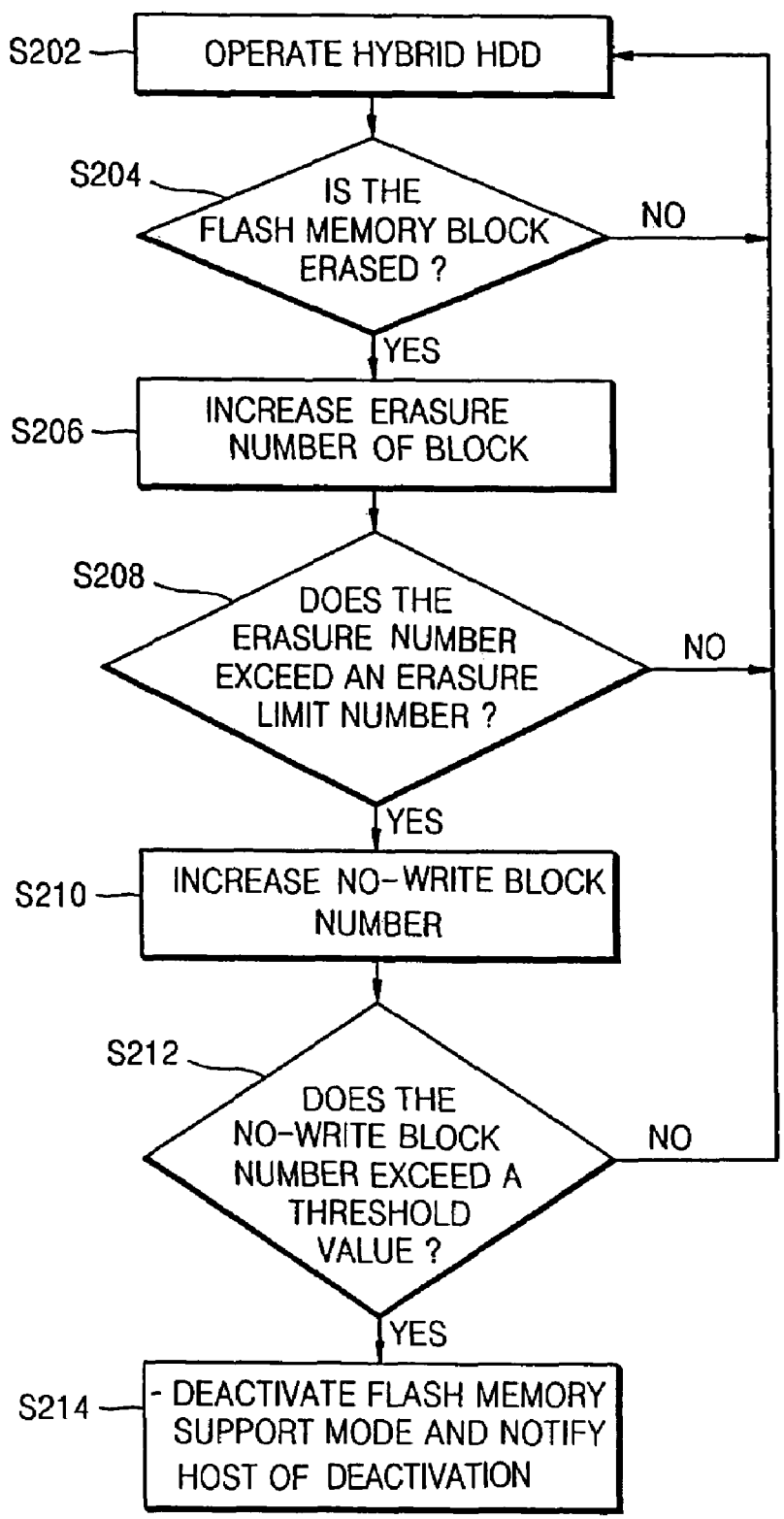
FIG. 2 is a flowchart illustrating a method of controlling a hybrid HDD according to an embodiment of the present general inventive concept.

FIG. 2 is a flowchart illustrating a method of controlling a hybrid HDD according to an embodiment of the present general inventive concept. Referring to FIG. 2, the hybrid HDD executes a command instructed by a host (S202), e.g., a command to write data to a non-volatile (NV) cache, read the data. Information on the hybrid HDD is disclosed in detail in "NV Cache Command Proposal" (Dec. 2, 2005) posted on a website (http://www.t13.org/#Project_drafts) and NV cache commands are included in ATA8-ACS.

Whether a block of the non-volatile cache is erased is determined (S204). An erasure operation must be preceded to write new data to a flash memory. When the block of the non-volatile cache is not erased in S204, for example, a read operation is performed and the program returns to S202. The flash memory may perform the erasure operation in units of blocks.

When the block is determined to be erased in S204, the number of erasing operations (erasure number) of the block is increased by one (S206). The erasure number for each block is recorded in a spare area of the non-volatile cache, for example, a spare area for each block or a block assigned for maintenance data.

When the erasure number is determined not to exceed a predetermined erasure limit number in S208, the program returns to S202. Otherwise, the block is processed to be no-write and a no-write block number is increased by one (S210).

When the number of no-write blocks (block number) is determined not to exceed a predetermined threshold value in S212, the program returns to S202. Otherwise, the non-volatile cache support mode is permanently deactivated and the host is notified of the deactivation (S214).

Figure 3:
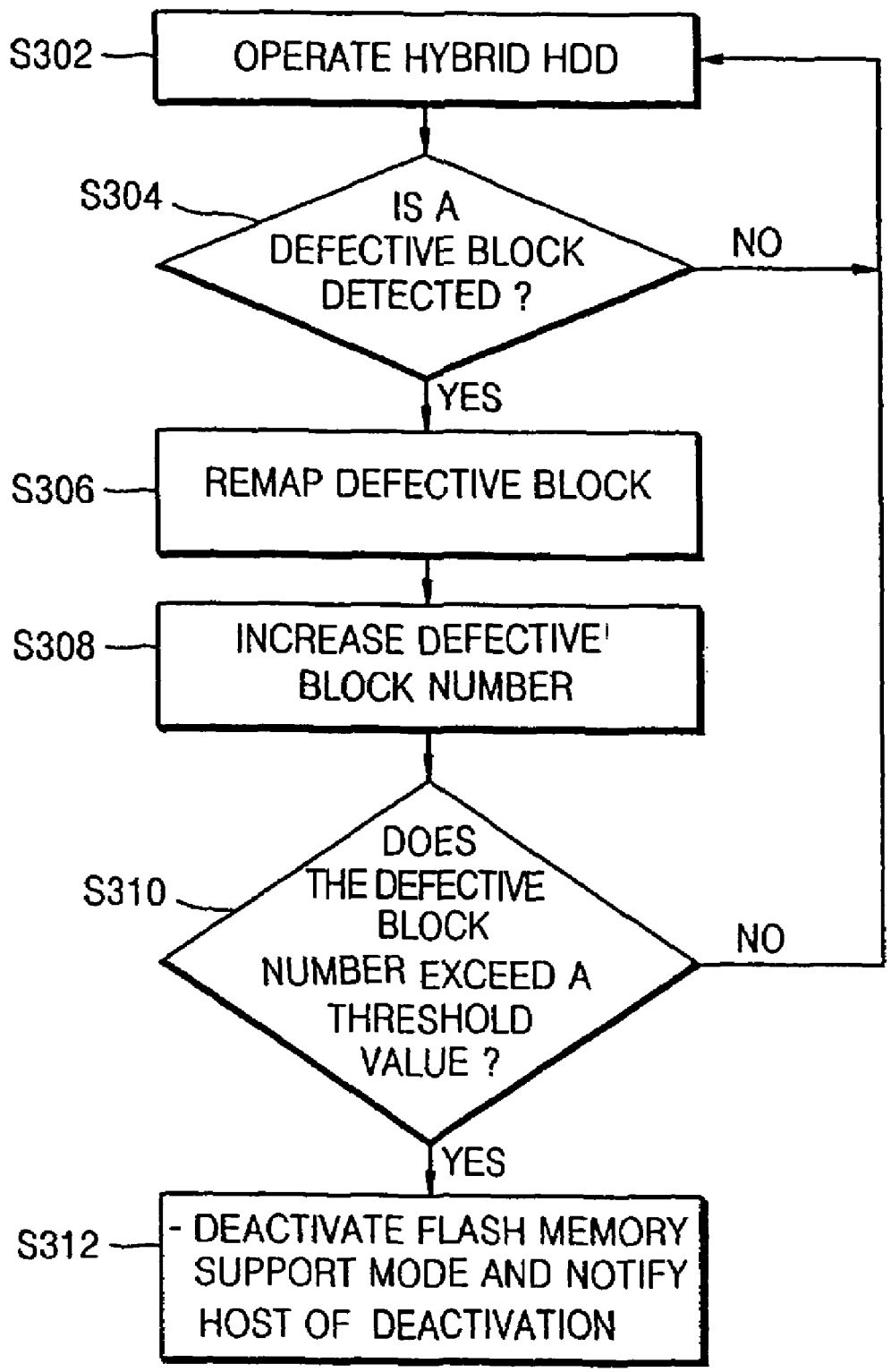
FIG. 3 is a flowchart illustrating a method of controlling a hybrid HDD according to another embodiment of the present general inventive concept.

FIG. 3 is a flowchart illustrating a method of controlling a hybrid HDD according to another embodiment of the present general inventive concept. Referring to FIG. 3, a hybrid HDD executes a command given by a host (S302). Whether a defective block is detected is determined (S304). The defective block is a block to which data is not normally written or from which data is not normally read. The blocks having the erasure number exceeding an erasure number limit, are highly likely to be the defective blocks.

The defective blocks are remapped (S306). Since the defective blocks cannot be used any longer, they are replaced by other spare blocks. The number of defective blocks (block number) is subsequently increased (S308).

When the defective block number is determined to exceed a predetermined limit block number in S310, the program returns to S302. Otherwise, the non-volatile cache support mode is permanently deactivated and the host is notified of the deactivation (S312).

Figure 4:
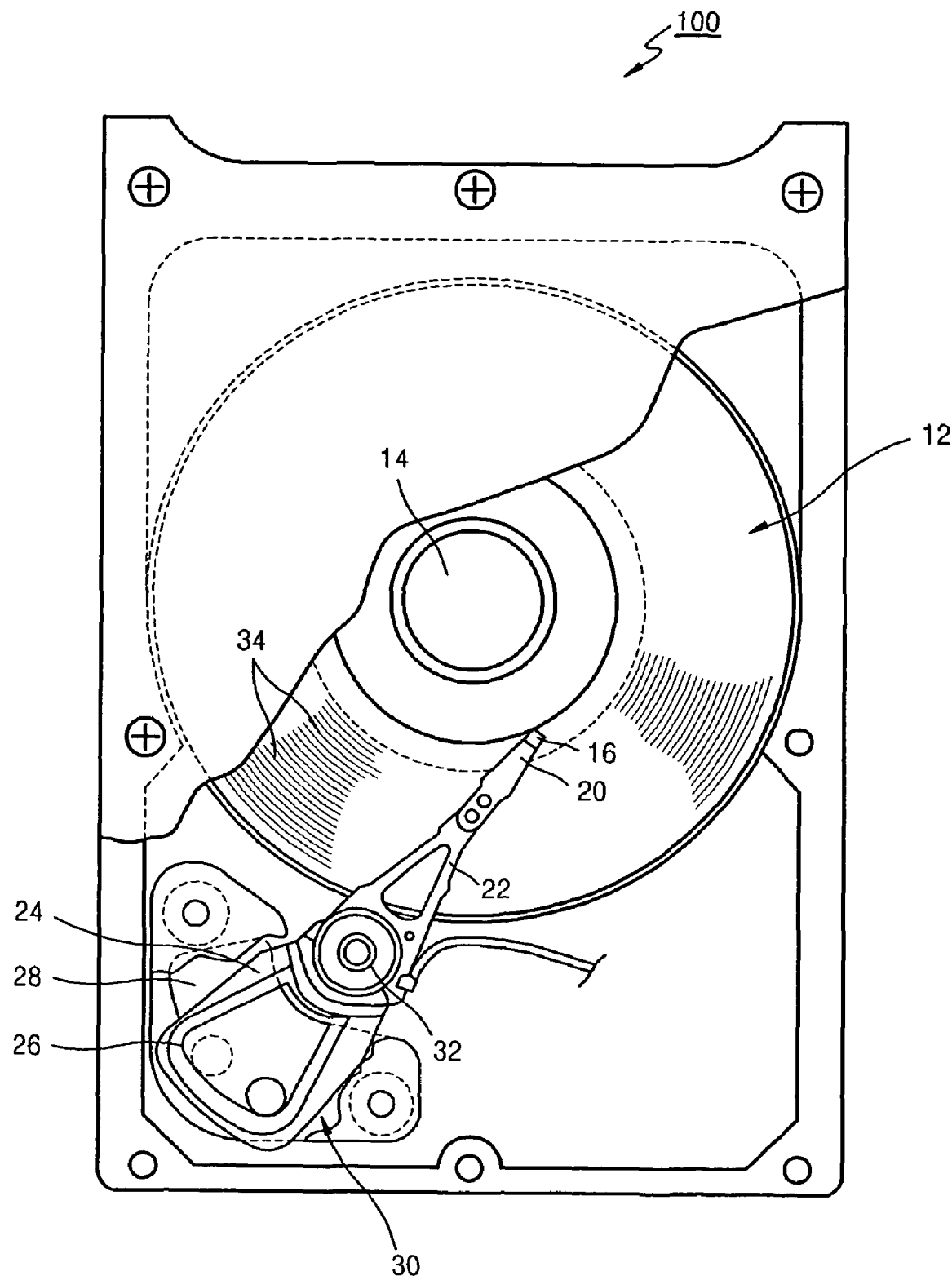
FIG. 4 is a plan view illustrating the configuration of a hybrid HDD according to an embodiment of the present general inventive concept.

FIG. 4 is a plan view illustrating a hybrid HDD according to an embodiment of the present general inventive concept. Referring to FIG. 4, a hybrid HDD 100 according to the present embodiment includes at least one disk 12 rotated by a spindle motor 14. The HDD 100 also includes a head 16 located adjacent to the surface of the disk 12.

The head 16 may read or write information with respect to the disk 12 by detecting a magnetic field formed on the magnetic regions 34 on the surface of the disk 12 or magnetizing the magnetic regions 34 on the surface of the disk 12. Although FIG. 4 illustrates a single head, the head 16 may include a write head to magnetize the disk 12 and a read head separately provided to detect the magnetic field of the disk 12.

The head 16 may be incorporated in a slider (not shown). The slider has a structure to generate an air bearing between the head 16 and the disk 12. The slider is attached to a suspension 20 that is coupled to a head stack assembly (HSA) 22. The HSA 22 is coupled to an actuator arm 24 having a voice coil 26. The voice coil 26 is located adjacent to a magnetic assembly 28 specifying a voice coil motor (VCM) 30 therewith. VCM drive current supplied to the voice coil 26 generates a drive force to rotate the actuator arm 24 with respect to a bearing assembly 32. As the actuator arm 24 rotates, the head 16 is moved across the surface of the disk 12.

Figure 5:
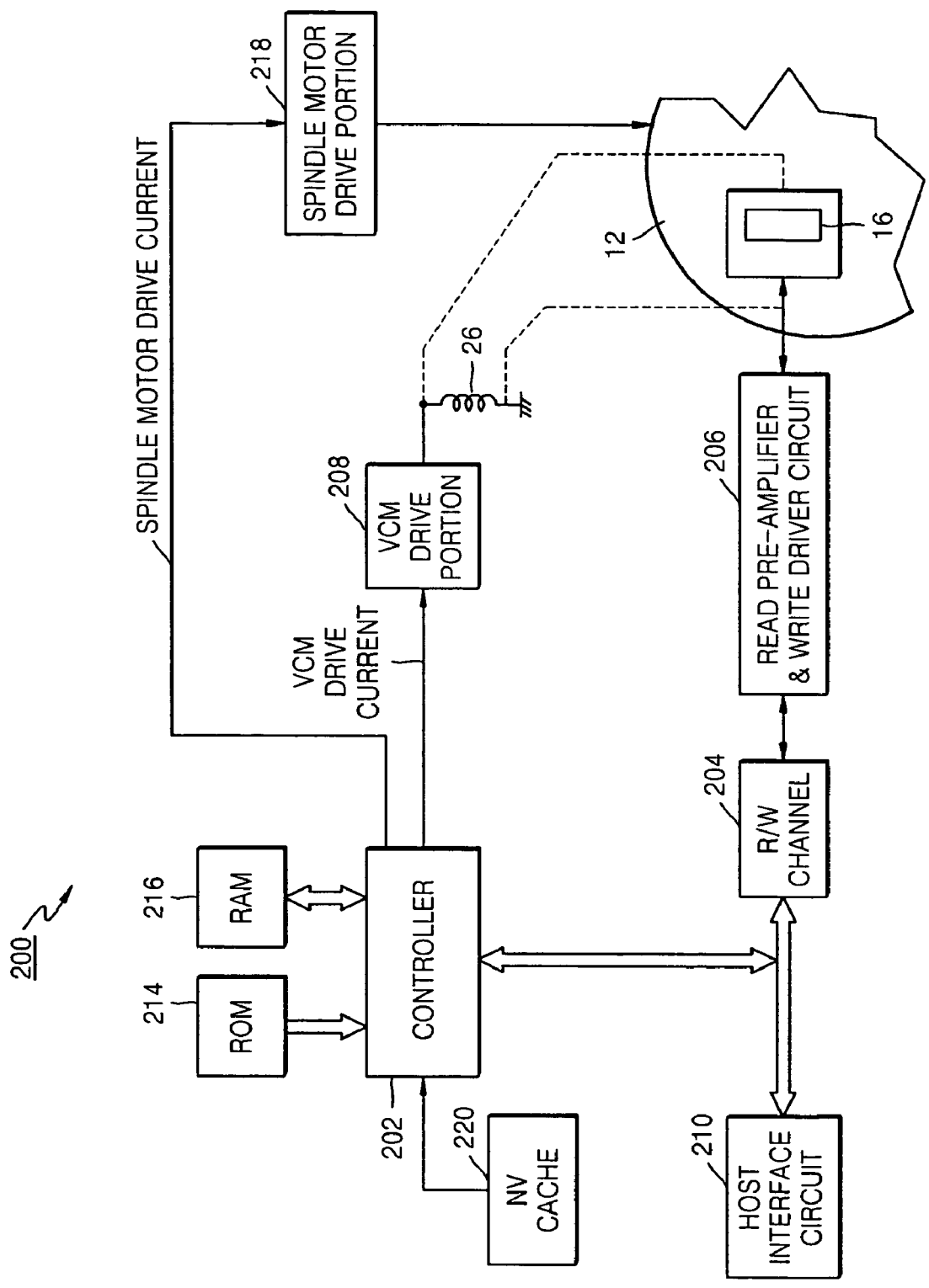
FIG. 5 is a block diagram illustrating the configuration of a circuit to control the hybrid HDD of FIG. 4.

FIG. 5 is a block diagram illustrating a circuit to control the HDD of FIG. 4. Referring to FIG. 5, the HDD in the present embodiment includes a control apparatus 200. The control apparatus 200 includes a controller 202, which is coupled to the head 16 by both a read/write (R/W) channel circuit 204 and a read pre-amplifier & write driver circuit 206. The controller 202 may be a digital signal processor (DSP), a microprocessor, or a micro controller.

The controller 202 supplies a control signal to the R/W channel 204 to read data from the disk 12 or write data to the disk 12. Information is typically transmitted from the R/W channel 204 to a host interface circuit 210. A data buffering operation is performed between the host interface circuit 210, an NV cache 220, a DRAM cache (not shown), and the R/W channel 204. The DRAM cache is embodied by a DRAM buffer (not shown). The DRAM buffer is operationally interposed between the host interface circuit 210 and the R/W channel 204, or may be installed inside the host interface circuit 210. The host interface circuit 210 includes a control circuit to interface with a system such as a personal computer.

The R/W channel circuit 204, in a reproduction mode, converts an analog signal read by the head 16 and amplified by the read pre-amplifier & write driver circuit 206 to a digital signal that may be read by a host computer (not shown) and outputs the converted signal to the host interface circuit 210 via a DRAM buffer (not shown), or converts data received through the host interface circuit 210 to write current to be written to the disk and outputs the converted current to the read pre-amplifier & write driver circuit 206. The host computer communicates with the control apparatus 200 through the host interface circuit 210, to transmit a commence to control the control apparatus 200.

The controller 202 is coupled to a VCM drive portion 208 that supplies drive current to a voice coil 126. The controller 202 supplies a control signal to the VCM drive portion 208 to control the excitation of the VCM 30 and the movement of the head 16. The controller 202 is coupled to a read only memory (ROM) 214 and a random access memory (RAM) 216. The ROM 214 and the RAM 216 include commands and data used by the control 202 to execute software routines.

A program to execute a control method of the hybrid HDD according to the present embodiment is stored as one of the software routines. The ROM 214 is designed as a non-volatile memory. The controller 202 determines whether the non-volatile cache 220 is used over a usage limit based on the erasure number of the non-volatile cache 220 and the defective block number. When the non-volatile cache 220 is determined to be used over the usage limit, the controller 202 permanently deactivates the non-volatile cache support mode and notifies the host of the deactivation.

The present general inventive concept may also be embodied as a method, an apparatus, or a system. When the present general inventive concept is embodied as software executed by a computer readable medium, the constituent elements of the present general inventive concept are code segments that execute necessary jobs. Programs or code segments may be stored in a processor readable medium. The processor readable medium includes any physical data storage device that may store data. Examples of the processor readable medium may include electronic circuits, semiconductor memory devices, read-only memory (ROM), flash memory, erasable ROM (EROM), floppy disks, optical disks, hard disks, and optical fiber medium. A computer data signal includes any signals that may be transmitted through a transmission medium such as an electronic network channel, optical fiber, air, electronic field, and RF network.

As described above, according to a control method according to the present invention, in a hybrid HDD using a non-volatile cache, since the non-volatile cache is permanently deactivated when it is used over the usage limit, the reliability of the HDD is improved.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of controlling a hybrid hard disk drive comprising a hard disk and a non-volatile cache, the method comprising:
    determining whether a no-write number of blocks in the non-volatile cache exceeds a no-write threshold; and
    permanently deactivating a non-volatile cache support mode to prevent further use of the non-volatile cache when it is determined that the no-write number of the non-volatile cache exceeds the no-write threshold.

2. The method of claim 1, wherein the determining of the no-write number comprises:
    determining an erasure number for each block of the non-volatile cache by counting a number of erasing operations performed on each block; and
    increasing the no-write number for the non-volatile cache when it is determined that the erasure number of a block of the non-volatile cache exceeds a predetermined erasure limit number.

3. The method of claim 2, wherein the no-write number is recorded in a spare area of the non-volatile cache or a block assigned to maintenance data.

4. The method of claim 1, wherein the determining of the no-write number comprises:
    determining an erasure number for each block of the non-volatile cache by counting the number of erasing operations performed by the non-volatile cache;
    determining a no-write block number by counting the number of blocks for which the erasure number is greater than a predetermined erasure limit number; and
    determining whether the no-write number of the non-volatile cache exceeds a predetermined threshold value.

5. The method of claim 4, wherein the no-write number is recorded in a spare area of the non-volatile cache or a block assigned to maintenance data.

6. The method of claim 4, wherein the determining of the no-write number further comprises:
    detecting a defective block number of the non-volatile cache by detecting the number of defective blocks in the non-volatile cache; and
    increasing the no-write number by the defective block number.

7. The method of claim 1, wherein the determining of the no-write number comprises:
    detecting a defective block number of the non-volatile cache by detecting the number of defective blocks in the non-volatile cache; and
    determining that the no-write number of the non-volatile cache exceeds a no-write threshold when the defective block number is not less than a predetermined threshold value.

8. The method of claim 1, wherein the no-write number is recorded in a spare area of the non-volatile cache or a block assigned to maintenance data.

9. The method of claim 1, further comprising:
    notifying a host device of a non-volatile cache support mode being deactivated, wherein the host device is notified when a recording in the non-volatile cache is no longer effective, so that the host device no longer uses the non-volatile cache.

10. A non-transitory computer readable recording medium containing a program executing a method of controlling a hybrid hard disk drive having a hard disk and a non-volatile cache, wherein the method comprises:
    determining whether a no-write number of blocks of the non-volatile cache exceeds a no-write threshold; and
    permanently deactivating a non-volatile cache support mode to prevent further use of the non-volatile cache when it is determined that the no-write number of the non-volatile cache exceeds the no-write threshold.

11. The non-transitory computer readable recording medium of claim 10, wherein the determining of the no-write number further comprises:
    determining the erasure number for each block of the non-volatile cache by counting the number of erasing operations performed on each block; and
    increasing the no-write number when it is determined that the erasure number for a block of the non-volatile cache exceeds a predetermined erasure limit number.

12. The non-transitory computer readable recording medium of claim 10, wherein the determining of the no-write number further comprises:
    determining an erasure number for each block of the non-volatile cache by counting the number of erasing operations performed on each block;
    determining a no-write block number by counting the number of blocks for which the erasure number is greater than a predetermined erasure limit number; and
    determining that the no-write number of the non-volatile cache exceeds a no-write threshold when the no-write block number is greater than a predetermined threshold value.

13. The non-transitory computer readable recording medium of claim 12, wherein the determining of the no-write number further comprises:
    detecting a defective block number of the non-volatile cache by detecting the number of defective blocks in the non-volatile cache; and
    increasing the no-write number by the defective block number.

14. The non-transitory computer readable recording medium of claim 10, wherein the determining of the usage limit further comprises:
    detecting a defective block number of the non-volatile cache by detecting the number of defective blocks in the non-volatile cache; and
    determining that the no-write number of the non-volatile cache exceeds a no-write threshold when the defective block number is not less than a predetermined threshold value.

15. The non-transitory computer readable recording medium of claim 10, wherein the method of controlling a hybrid hard disk drive having a hard disk and a non-volatile cache further comprises:
    an operation of notifying a host device of a non-volatile cache support mode being deactivated; and
    notifying the host device when recording in the non-volatile cache is no longer effective, so that the host device no longer uses the non-volatile cache.

16. A hybrid hard disk drive comprising:
    a hard disk;
    a non-volatile cache; and
    a control portion to control recording of data from a host on the hard disk and the non- volatile cache,
    wherein the control portion determines whether a no-write number of the non-volatile cache exceeds a no-write threshold and permanently deactivates a non-volatile cache support mode to prevent further use of the non-volatile cache when it is determined that the no-write number of the non-volatile cache exceeds the no-write threshold.

17. The hybrid hard disk drive of claim 16, wherein the control portion notifies the host device when recording in the non-volatile cache is no longer effective, so that the host device no longer uses the non-volatile cache.

18. A method of a hybrid hard disk drive comprising a hard disk and a non-volatile cache, the method comprising:
    detecting a defective block number of a non-volatile cache by detecting the number of defective blocks in the non-volatile cache;
    determining whether the defective block number equals or exceeds a predetermined threshold value; and
    permanently deactivating a non-volatile cache support mode to prevent further use of the non-volatile cache when it is determined that the defective block number equals or exceeds the predetermined threshold value.

19. The method of claim 18, further comprising:
    remapping the defective blocks;
    replacing the defective blocks by spare blocks; and
    increasing the defective block number.

20. The method of claim 19, further comprising:
    executing a command given by a host when the defective block number is determined to exceed the predetermined limit block number; and
    notifying the host of the deactivation.

* * * * *